(12) United States Patent
Smith

(10) Patent No.: US 6,356,041 B1
(45) Date of Patent: Mar. 12, 2002

(54) MASTER THREE-PHASE INDUCTION MOTOR WITH SATELLITE THREE-PHASE MOTORS DRIVEN BY A SINGLE-PHASE SUPPLY

(76) Inventor: Otto J. M. Smith, 612 Euclid Ave., Berkeley, CA (US) 94708

( * ) Notice: Subject to any disclaimer, the term of this patent is extended or adjusted under 35 U.S.C. 154(b) by 0 days.

(21) Appl. No.: 09/580,935

(22) Filed: May 25, 2000

(51) Int. Cl.$^7$ .................................................. H02P 1/54
(52) U.S. Cl. ........................... 318/34; 318/49; 318/781; 318/768
(58) Field of Search ............................. 318/34, 49, 781, 318/794, 768, 771

(56) References Cited

U.S. PATENT DOCUMENTS

| | | | | |
|---|---|---|---|---|
| 3,851,232 A | * | 11/1974 | Chigwin | 318/150 |
| 4,792,740 A | * | 12/1988 | Smith | 318/768 |
| 5,300,870 A | * | 4/1994 | Smith | 318/768 |
| 5,545,965 A | * | 8/1996 | Smith | 318/768 |
| 5,760,493 A | * | 6/1998 | Outcalt et al. | 307/38 |

* cited by examiner

Primary Examiner—Marlon T. Fletcher
Assistant Examiner—Rita Leykin
(74) Attorney, Agent, or Firm—Flehr Hohbach Test Albritton & Herbert LLP

(57) ABSTRACT

A motor system utilizes a master three-phase induction motor driven by a single-phase power supply which the motor has six-windings connected in a symmetrical double DELTA or double WYE configuration with appropriate running capacitors to provide when the motor is running a balanced three-phases of voltage potentials. The potentials have been tapped off to run satellite three-phase induction motors.

24 Claims, 5 Drawing Sheets

MASTER THREE-PHASE INDUCTION MOTOR WITH SATELLITE THREE-PHASE MOTORS DRIVEN BY A SINGLE-PHASE SUPPLY

The present invention is directed to a master three-phase induction motor with satellite three-phase motors driven by a single-phase supply and method.

BACKGROUND OF THE INVENTION

As illustrated in Smith U.S. Pat. No. 4,792,740, a three-phase induction motor can be efficiently driven by a single-phase power supply by splitting the three windings into six and connecting them into two symmetrical half motors. To accomplish the technique of running a three-phase motor on a single-phase power supply there are also starting capacitors and running capacitor connections illustrated. Also the symmetrical motor may be a dual or double DELTA as shown in FIG. 14B or a dual WYE or YY as shown in FIG. 14A. In another Smith U.S. Pat. No. 6,049,188, greater details involving the use of starting capacitors, especially for high horsepower applications, are illustrated in FIG. 15 of that patent for a dual WYE connection type motor.

OBJECT AND SUMMARY OF THE INVENTION

It is an object of the present invention to provide a master three-phase induction motor with satellite three-phase motors driven by a single-phase supply and method.

In accordance with the above object there is provided a motor system having a master three-phase induction motor with three winding pairs for driving one or more of smaller horsepower satellite three-phase induction motors, the master motor being driven by a single-phase power supply having a pair of supply lines, the three winding pairs being connected into two symmetrical double DELTA or double WYE half motors each having three terminals with one terminal being common and having voltage potentials, in response to the application of said single-phase power supply, with phases substantially at 120° from each other, the plurality of satellite motors being individually and, respectively, connected to one of the sets of three terminals.

DETAILED DESCRIPTION OF THE PREFERRED EMBODIMENT

Figure 1:
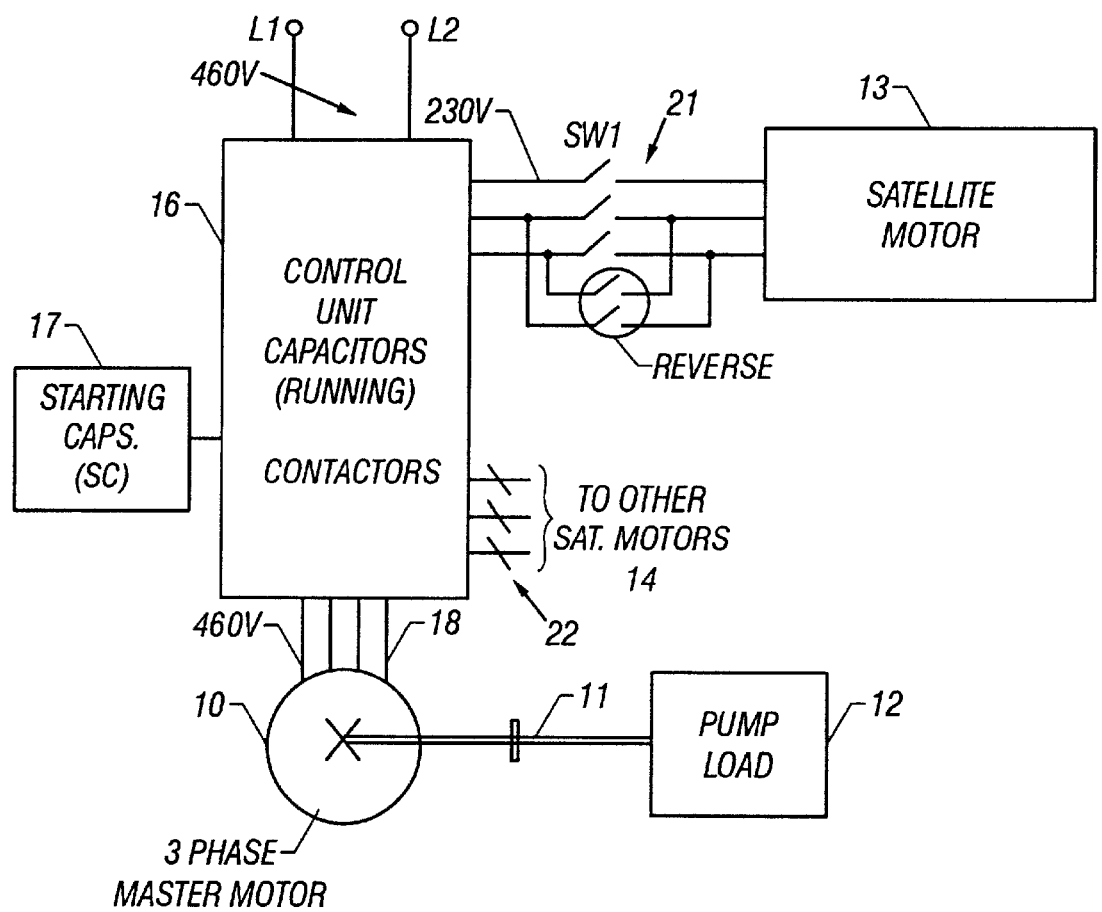
FIG. 1 is a block diagram of a motor system embodying the present invention.

A three-phase induction motor 10, which has six-windings connected in a manner to be discussed below, has a predetermined rated horsepower and drives by shaft 11 a pump load 12 which has a lower rated horsepower. For example, the three-phase master motor may be 75 horsepower with pump load of 56 horsepower leaving a difference of 19 horsepower. This will be sufficient to drive several three-phase satellite motors indicated as 13 and 14, all of which are connected via parallel three-phase lines to a control unit 16 which contains inboard running capacitors, contactors and logic circuits and an outboard unit 17 of starting capacitors.

The entire system is driven from a single-phase supply voltage designated by lines L1 and L2 which is nominally 460 volts. By the technique of the above Smith patents, the single-phase voltage is converted to a three-phase voltage on the output lines shown at 18 to drive the motor 10 and its pump load 12. At the same time, under the method of the present invention voltages are tapped off of the symmetrical half motor windings via the wire connection 18 of the master motor 10 to provide two three-phase sources 21 and 22 going to satellite motors 13 and 14. The three-phase lines are in parallel to the satellite motors so that each satellite motor may be controlled individually. Thus, the representative satellite motor 13 is illustrated by the transmission and switching system shown in 21 being driven in the forward direction by closure of the switch set SW1 or reversed by reversal of any two of the three-phase wires as indicated by the reverse switches in a manner well known in the art.

Figure 2:
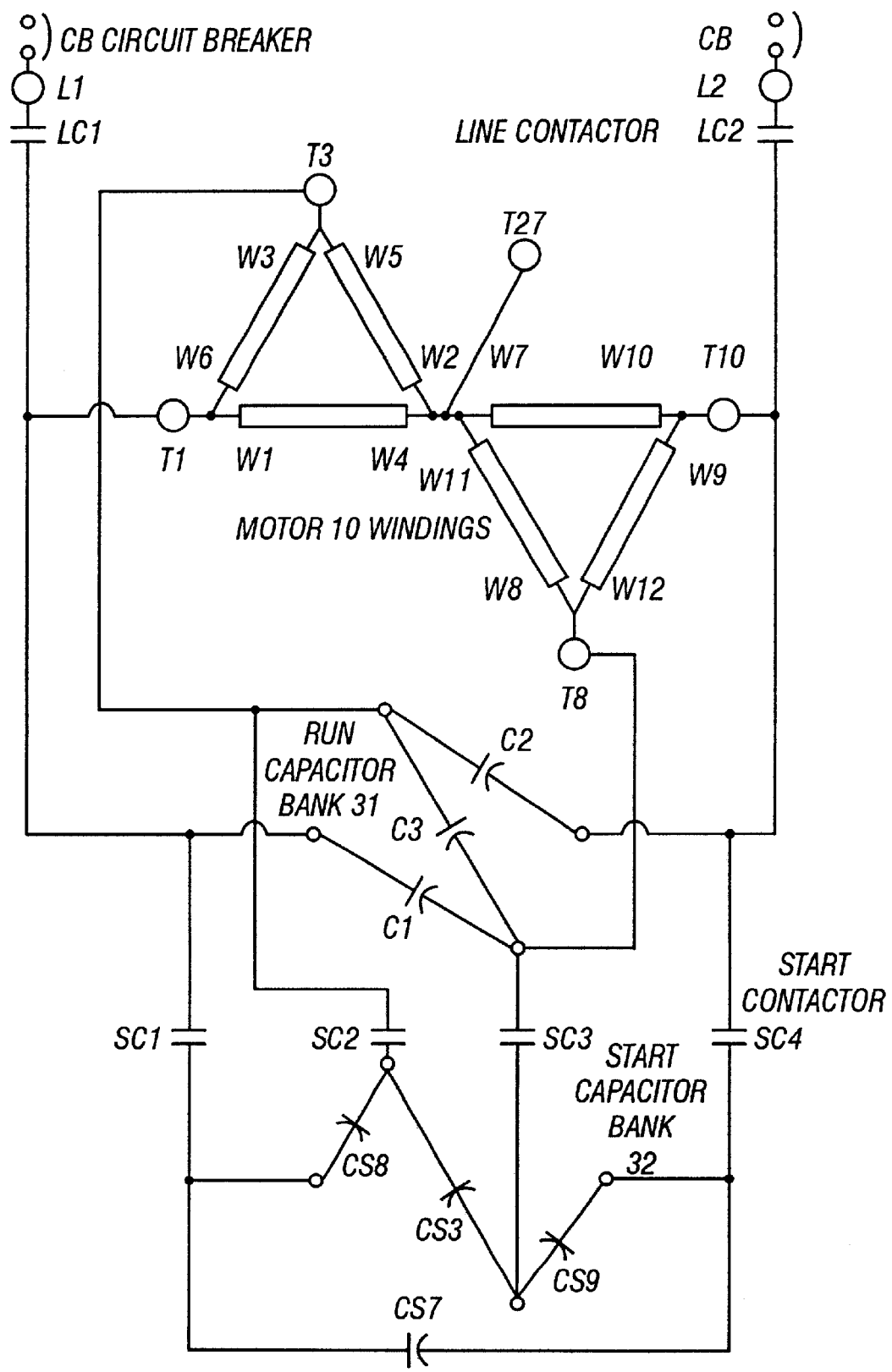
FIG. 2 is a circuit diagram of a double DELTA symmetrical motor.

FIG. 2 illustrates two half motor windings in a dual DELTA or double DELTA connections for the motor 10 which are designated variously W1 through W12, and the single-phase supply lines L1 and L2. There are circuit breakers CB and line contactors LC1 and LC2. The center tap of the dual DELTA is terminal T27 which is connected to winding terminals W2, W4, W7 and W11. This terminal may also be called a central terminal because it is the series connection between the two DELTA half motor winding portions. External terminal T1 is connected to winding terminals W1 and W6, and T3 to W3 and W5. The various run capacitors as shown by the run capacitor bank 31 include run capacitors C1, C2 and C3. It has been observed when the motor 10 is running that the voltages between these three terminals is an almost or substantially balanced three-phase voltage; i.e., the voltage potentials are substantially 120 degrees from each other. And this is also true of the other symmetrical half motor which includes the terminals T8, T10 and the common terminal 27. A start capacitor bank 32 is also illustrated, which includes the start contactors SC1 through SC4 which are temporarily actuated as described in the above Smith patent along with the start capacitors CS3, CS8, CS9 and CS7. All of these run and start capacitors are described in the above Smith patents and especially the '188 patent.

Figure 3:
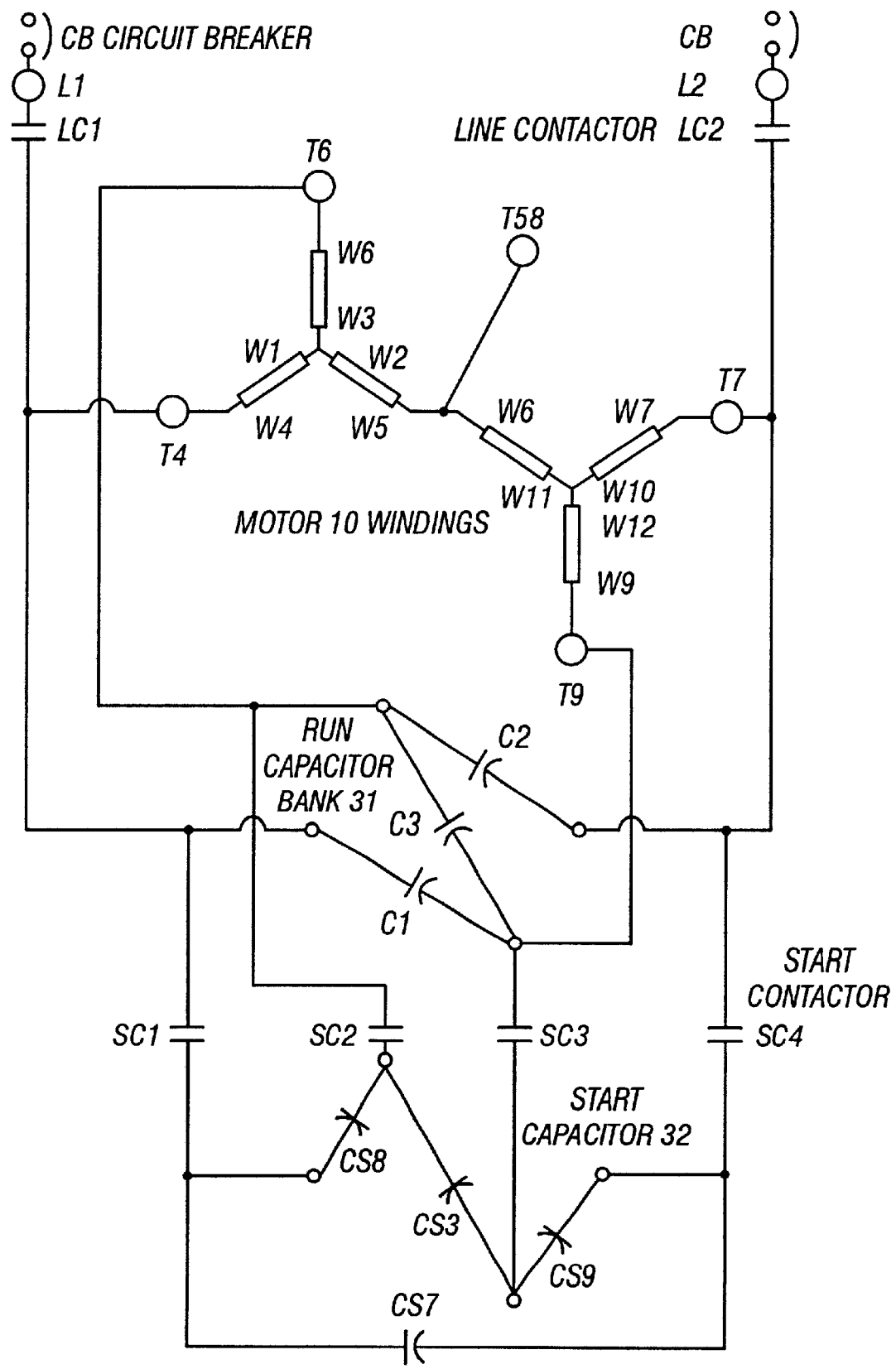
FIG. 3 is a circuit diagram of a double WYE symmetrical motor.

FIG. 3 is almost identical to FIG. 2, but the motor 10' is now connected in a double WYE configuration. The same winding terminal notation W1, etc., is utilized. Here the first half motor includes the common terminal T58 along with T4 and T6 and the other half motor terminals T7, T9 and T58. As is apparent run capacitor bank 31 and start capacitor bank 32 are identical to FIG. 2 and operate in the same manner. Specifically, the start capacitors and the run capacitors provide balanced currents and appropriate phase voltages in combination with the motor connection as described in the above Smith patents. This provides at the three output terminals of each half motor, a balanced three-phase voltage. Moreover, when a current is drawn externally from these terminals as will be described below, balanced three-phase currents are provided. Referring to FIGS. 2 and 3, the motor terminals may also be designated, besides T27 and T58 being the central terminal, with T1 and T4 can be regarded as second terminals, T10 and T7 also as second terminals, T3 and T6 as first extra terminals, and T8 and T9 as second extra terminals.

The start capacitor bank 31 operates as follows. First, referring to FIG. 2, capacitor CS3 injects a starting-current component into T8 through contacts SC3 of the start contactor. This current component lags the apparent line-to-pseudo-neutral voltage by 60° and is the 50% power-factor current component. Capacitor CS9 injects a starting-current component into T8 which lags the apparent line-to-pseudo-neutral voltage by 120°. The sum of these two current components is selected to equal a pre-selected locked-rotor line current, which is usually the master motor locked-rotor current. Capacitor CS8 is equal in microfarads to capacitor CS9. It injects a starting current component into T3 so that the winding currents on starting are symmetrical and balanced. Capacitor CS7 is chosen to adjust the single-phase line power-factor to unity.

In the start capacitor bank 32 of FIG. 3, capacitor CS3 injects a starting-current component into T9 through contacts SC3 of the start contactor. This current component lags the line-to-neutral voltage of W9–W12 by 60°, and can be called the 50% power-factor current. Capacitor CS9 injects a starting-current component into T9 which lags the line-to-neutral voltage of W9–W12 by 120°. The sum of these two current components into T9 is selected to equal a pre-selected locked-rotor line current, which is usually the locked-rotor current of the master motor. Capacitor CS8 is equal in microfarads to capacitor CS9. It injects a starting current component into T6 which added to the component from CS3 equals the same magnitude current in T6 as the current injected into T9, so that the winding currents on starting are symmetrical and balanced. Capacitor CS7 is chosen to adjust the single-phase line power-factor to unity at locked rotor.

The values of the run capacitors can be understood by an example. Consider the case when the master motor is rated 75 horsepower, with a full-load-3-phase line current of 85.6 amperes at 86.5% power factor. The shaft of this motor is connected to a pump which requires 56.25 horsepower on the shaft. With this shaft load, the motor efficiency is 95.3% and the three-phase line current is 66.6 amperes at 83% power-factor, which is a current lag angle of 33.9°. In rectangular coordinates, this load current is 55.3–j 37.15 amperes, at 460 volts. This component will be injected into T9 or T8.

Eight small drive motors of 2 horsepower each add to a total load of 16 horsepower. Four of these will be on one 230-volt supply, and the other four will be on the other half motor 230-volt supply, to balance the currents and loads. Each of these small motors has an efficiency of 86.5% and power factor of 83%, and the three-phase line current is 5 amperes at 230 volts, or 2.5 amperes at 460 volts. With all eight motors connected, the equivalent 460-volt load is 20 amperes at 83% power factor, a phase lag angle of 33.9°. To supply these eight motors, a rectangular coordinate current component must be injected of 16.6–j 11.16 amperes.

The sum of the two injected components is 71.9–j 48.3 amperes. This is 86.6 amperes lagging 33.9°, or 83% power-factor. The resolution of this sum current into I1 and I3 in capacitors C1 and C3, respectively, is:

$$I1=130=2\times86.6\sin(60-33.9)=76.2 \text{ amperes}$$

$$I3=160=2\times86.6\sin(33.9-30)=11.78 \text{ amperes.}$$

The capacitances in farads are:

$$\begin{aligned} C1 &= (76.2)/(377\times400) &= 505.3\exp(-06) \\ C3 &= (11.78)/(377\times460) &= 67.93\exp(-06) \\ C2 &= C1 &= 505.3\exp(-06). \end{aligned}$$

At full shaft load on all of the satellite motors, which sums to 72.25 horsepower, all of the motor windings have balanced currents. These are 2.5 amperes in the WYE windings, or 1.44 amperes in the DELTA windings. In the main motor, these are 66.6 amperes in the WYE windings, or 38.45 amperes in the DELTA windings. The composite performance at full load is 57.8 KW input, at 93.2% efficiency. The single-phase power line supplies all of this power plus the leading reactive vars of the capacitors. The single-phase line current is approximately 140 amperes at 88% power-factor leading at full load.

For this design, the master motor has an injected locked-rotor current of 677 amperes at 35.1% power-factor.

Figure 4:
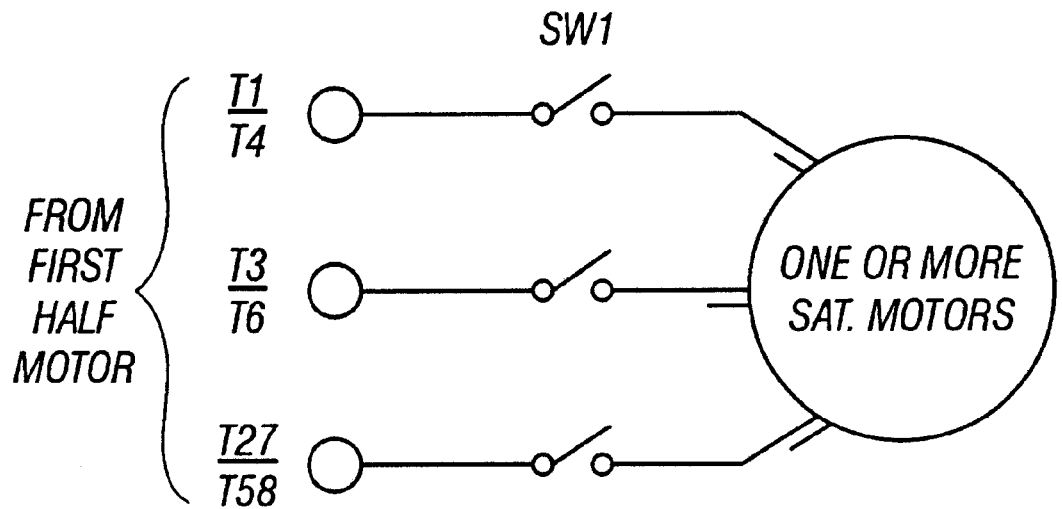
FIGS. 4 and 5 are circuit schematics illustrating the connection of satellite motors to the master motor.
Figure 5:
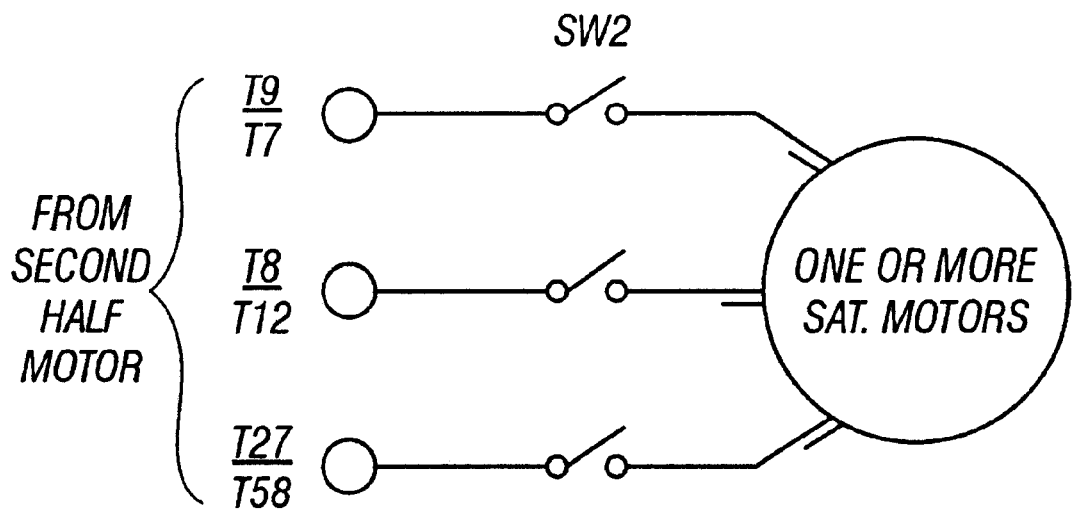

FIGS. 4 and 5 show in detail the connections as already illustrated by circuit connection 21 in FIG. 1. FIG. 4 illustrates the terminal connections which are in parallel through a switch SWI supplying one or more satellite motors from the first symmetrical half motors for both the double DELTA, that is T1, T3, T27 and the double WYE, T4, T6, T58. FIG. 5 with reference to switch SW2 shows the connections from the second symmetrical half motors.

Figure 6:
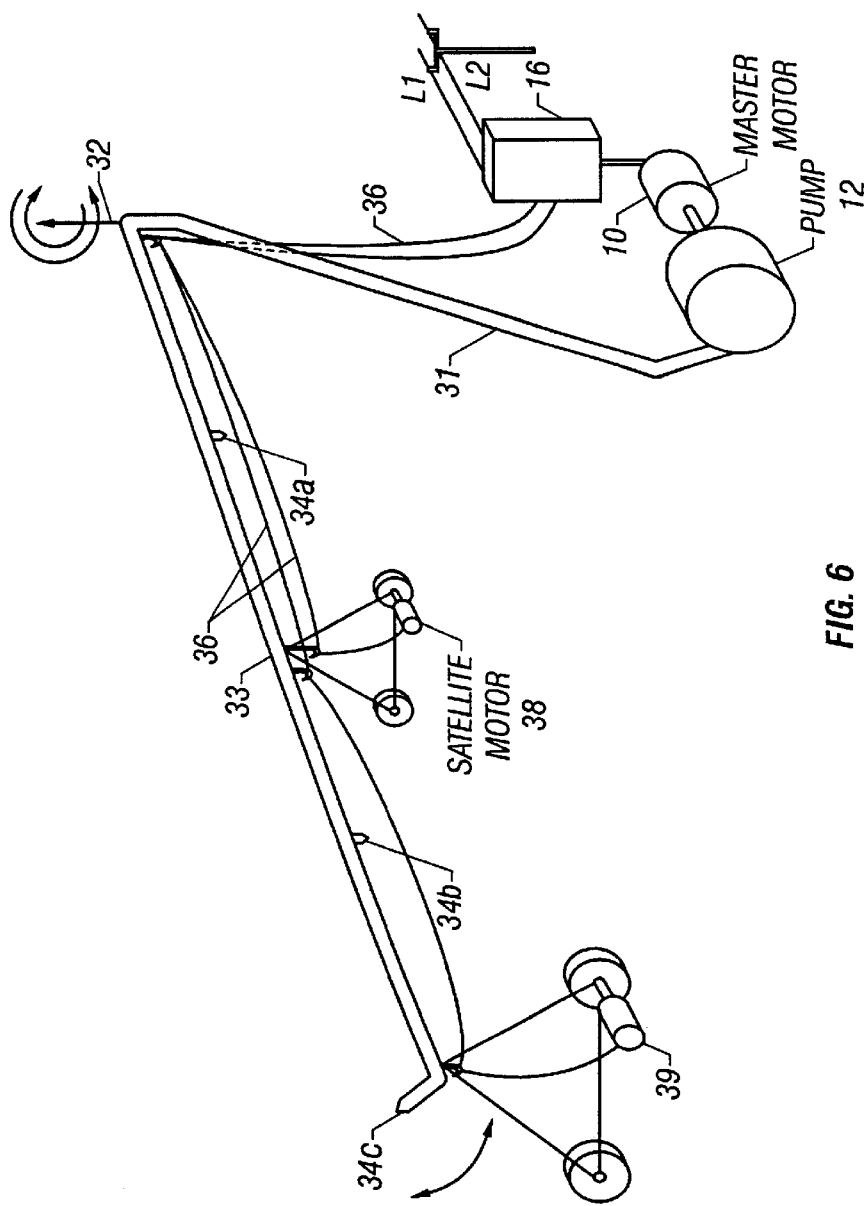
FIG. 6 is a perspective drawing of an implementation of the invention in an irrigation system.

Of course, the switches SW1 and SW2 would have a reverse capability as illustrated in FIG. 1. The switches would also have a timing capability for irrigation purposes as illustrated in FIG. 6. Here, the master motor 10 with a pump load 12 is illustrated along with the control unit 16 receiving single-phase power and power lines L1 and L2. Pump 12 via the hydraulic pipe 31 is connected at a pivot point 32 so that the arm 33 containing sprinkler nozzles 34a, 34b and 34c may be rotated in an agricultural field. For the electrical cables designated 36, there are separate three-phase cables for each motor as has been previously indicated. Satellite motors 38 and 39 are indicated on the drive wheels of the sprinkler arm 33. For the present embodiment, electrical cabling 36 would have as many wires as three times the number of satellite motors.

Figure 7:
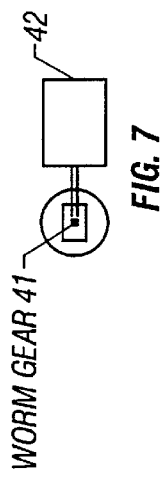
FIG. 7 is a block diagram of a modification of a portion of FIG. 6.

Rather than drive a drive wheel directly by the motor, FIG. 7 illustrates a worm gear 41 arrangement being driven by a satellite motor 42. Naturally, the inner radius motors would be actuated for a lesser amount of time than the outer radius motors. Most importantly as illustrated in FIG. 1, by use of the reversing switch as shown, at the axis of rotation 32, either direction of rotation may be achieved which is a necessity in the irrigation devices otherwise the electrical cabling 36 would be twisted beyond its reasonable capability.

Besides irrigation, the present invention has many other applications. For example, in a machine shop where the master motor drives a large air compressor and also feeds several smaller three-phase motors used on machine tools.

Thus, in summary by the use of the unique motor connections and capacitor connections described in the Smith patents, in the context of a symmetrical double DELTA or double WYE motor, the balanced three-phase voltages which are generated by that system may be utilized in a satellite motor system.

What is claimed is:

1. A motor system for use with a single-phase power source having first and second power lines, comprising a master three-phase induction motor with six windings forming three winding pairs connected into two symmetrical half motors, each half motor having three terminals, with one terminal of each half motor being common, said three terminals of each half motor having a balanced three-phase voltage on them when single-phase power is supplied to said master three-phase induction motor and at least one separate three-phase satellite induction motor coupled to the three terminals of at least one of the half motors.

2. A system as in claim 1 where said half motors are connected in series with each other across said single-phase power supply lines.

3. A system as in claim 2 including a first run capacitor connected between said first power line and one of said terminals of one of said half motors and a second run capacitor connected between said second power line and one of said terminals of the other said one half motor.

4. A system as in claim 1 where said master motor has a rated horsepower and drives a load of a predetermined horsepower which is less than the rated horsepower of said master motor, the difference between said predetermined horsepower of the load and said rated horsepower of the master motor being at least as great as the cumulative horsepower of said at least one satellite motor.

5. A motor system as in claim 1 including a pair of running capacitors connect ed to said single-phase power supply lines and predetermined half motor terminals to provide 120° phases for said balanced three-phase voltage.

6. A motor system as in claim 1 where said single-phase power supply has a voltage which is substantially double the individual three-phase voltage supplied to said satellite motors.

7. In a combination with a single-phase power supply having first and second power lines, comprising a six-winding master three-phase induction motor having a rated horsepower and having three of the six windings being connected as a symmetrical first three-terminal half motor and having the other three windings of the six windings connected as a symmetrical second three-terminal half motor, one terminal of the first half motor being connected to one terminal of the second half motor to provide a central terminal, a second terminal of the first half motor being adapted to be connected to the first power line, a second terminal of the second half motor being adapted to be connected to the second power line to thereby provide a series connection of the two half motors between the two single-phase power lines providing balanced three-phase voltages on the terminals of first and second half motors and a plurality of satellite three-phase induction motors having a combined rated horsepower less than the rated horsepower of said master motor and connected to said terminals of said first and second half motors.

8. A motor as in claim 7, wherein the third terminals of said first and second half motors are designated as first and second extra terminals respectively, and further comprising first, second and third starting capacitors, switching means for temporarily connecting the first starting capacitor between said first extra terminal and said second extra terminal, switching means for temporarily connecting the second starting capacitor between said first extra terminal and the first power line, and switching means for temporarily connecting the third starting capacitor between the second extra terminal and the second power line.

9. A combination as in claim 7, further comprising a first run capacitor connected between said first power line and said second extra terminal, and a second run capacitor connected between said second power line and said first extra terminal.

10. A combination as in claim 9, further comprising a third run capacitor connected between said first extra terminal and said second extra terminal.

11. A system of electrical motors for use with a single-phase electrical power source on first and second power lines, consisting of a master motor comprising a rotor and first and second electrical three-phase half motors wound to form a common magnetic stator structure coupled magnetically to the rotor, the first of said electrical half motors having a first electrical winding terminal, a second electrical winding terminal and a third electrical winding terminal, the second of said electrical half motors having a fourth electrical winding terminal, a fifth electrical winding terminal and a sixth electrical winding terminal, means adapted to electrically connect said fifth electrical winding terminal to said second power line, an auxiliary power terminal, means for electrically interconnecting said second electrical winding terminal, said fourth electrical winding terminal and said auxiliary power terminal and at least one satellite motor having a rotor, each satellite motor comprising a rotor and three electrical windings coupled magnetically to the rotor of the satellite motor and having electrical terminals A, B and C, means adapted to electrically connect said terminal A to said first power line, means for electrically connecting said terminal B to said auxiliary power terminal and means for electrically connecting said terminal C to said third electrical winding terminal.

12. A system as in claim 11, wherein said at least one satellite motor includes a third three-phase satellite motor with terminals D, E and F, and further including means for electrically connecting terminal D to said second power line, means for electrically connecting terminal E to said auxiliary power terminal, and means for electrically connecting terminal F to said sixth electrical winding terminal.

13. A system as in claim 11, wherein the said single-phase electrical power source has a predetermined voltage of magnitude V, the voltage between the said first and second electrical winding terminals being approximately one-half of V, and the voltage between the said fourth and fifth electrical winding terminals being approximately one-half of V while single-phase power is applied to the system.

14. A system as in claim 13, wherein the voltage between the said first and said third electrical winding terminals is approximately one-half of V.

15. A system as in claim 13, wherein the voltage between the said third and said sixth electrical winding terminals is approximately equal in magnitude to V.

16. A system as in claim 11, further comprising a first capacitor connected electrically between said first and said sixth electrical winding terminals.

17. A system as in claim 16, further comprising a second capacitor connected electrically between said third and said fifth electrical winding terminals.

18. A system as in claim 11, further comprising a third capacitor connected electrically between said third and said sixth electrical winding terminals.

19. A system as in claim 11, wherein the voltages on the said first, second and third electrical winding terminals comprise roughly a three-phase system of voltages of predetermined magnitude of one-half of V.

20. A system as in claim 19, wherein the voltages on the said fourth, fifth and sixth electrical winding terminals comprise a three-phase system of voltages of predetermined magnitude of one-half of V.

21. A system as in claim 20, wherein the said master motor is a dual-voltage six-winding three-phase motor and wherein said single-phase electrical power source has a voltage magnitude of the higher of the dual voltages.

22. An irrigation system with a single-phase power supply having first and second power lines, a movable sprinkler pipe, a plurality of nozzles carried by the sprinkler pipe, a pump for supplying irrigation water to the sprinkler pipe, a three-phase master motor having a drive shaft for driving said pump, said master motor having six windings forming three winding pairs connected into two symmetrical half motors with each half motor having three terminals providing a balanced three-phase voltage, at least one three-phase satellite motor coupled to said movable sprinkler pipe for causing movement of said sprinkler pipe and spaced apart from said master three-phase induction motor and means electrically connecting the three-phase satellite motor to the three terminals of one of said half motors.

23. An irrigation system as in claim 22 wherein the power requirements for operating said pump are substantially less than the power capabilities of said master three-phase induction motor and wherein the combined requirements for three-phase power for the at least one satellite motor is within the residual power output capabilities of the master motor while it is driving the pump.

24. A method for supplying power to a three-phase induction motor and at least one of a plurality of satellite three-phase motors from a single-phase power supply having first and second power lines, comprising providing a three-phase induction motor with six windings forming three winding pairs connected into two symmetrical half motors with each half motor having three terminals and providing a substantially balanced three-phase voltage on the three terminals, utilizing the three-phase induction motor to drive a load which has power requirements which are less than the power capabilities of the three-phase induction motor, and utilizing the three-phase power provided by the three terminals of each half motor to supply power to the satellite motors having power requirements which are within the capabilities of the master three-phase induction motor during the time that the three-phase induction motor is supplying power to a load on the three-phase induction motor.

* * * * *